(12) United States Patent
Yasuda et al.

(10) Patent No.: US 10,456,753 B2
(45) Date of Patent: *Oct. 29, 2019

(54) POROUS HOLLOW FIBER MEMBRANE

(71) Applicant: TORAY INDUSTRIES, INC., Tokyo (JP)

(72) Inventors: Takaaki Yasuda, Shiga (JP); Masayuki Hanakawa, Shiga (JP); Kenta Iwai, Shiga (JP); Toshiyuki Ishizaki, Shiga (JP); Tamotsu Kitade, Shiga (JP); Masahiro Kimura, Shiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/755,755

(22) PCT Filed: Jun. 24, 2016

(86) PCT No.: PCT/JP2016/068878
§ 371 (c)(1),
(2) Date: Feb. 27, 2018

(87) PCT Pub. No.: WO2017/038224
PCT Pub. Date: Mar. 9, 2017

(65) Prior Publication Data
US 2018/0369757 A1  Dec. 27, 2018

(30) Foreign Application Priority Data

Aug. 31, 2015 (JP) ................................. 2015-170152

(51) Int. Cl.
*B01D 69/08* (2006.01)
*B01D 69/02* (2006.01)
(Continued)

(52) U.S. Cl.
CPC ....... *B01D 69/087* (2013.01); *B01D 67/0018* (2013.01); *B01D 67/0027* (2013.01);
(Continued)

(58) Field of Classification Search
CPC ........ B01D 69/08; B01D 69/02; B01D 71/34; B01D 2323/20; B01D 67/0027; B01D 67/003; B01D 63/021
See application file for complete search history.

(56) References Cited

U.S. PATENT DOCUMENTS 4,818,452 A * 4/1989 Kneifel .................. B01D 69/08
                                                             210/500.39
5,022,990 A * 6/1991 Doi ...................... B01D 67/003
                                                             210/500.23
(Continued)

FOREIGN PATENT DOCUMENTS

JP    2003-210954 A    7/2003
JP    2003-320228 A    11/2003
(Continued)

OTHER PUBLICATIONS

International Search Report, issued in PCT/JP2016/068878, PCT/ISA/210, dated Sep. 13, 2016.
(Continued)

*Primary Examiner* — Ana M Fortuna
(74) *Attorney, Agent, or Firm* — Birch, Stewart, Kolasch & Birch LLP

(57) ABSTRACT

The present invention provides a porous hollow fiber membrane that has both high strength and high pure water permeability, and that exhibits excellent thermal deformation resistance. The present invention is related to a porous hollow fiber membrane containing a fluororesin-based polymer, and a manufacturing method of the membrane comprises a drawing step and a relaxing step. The porous hollow
(Continued)

10 μm fiber membrane is characterized in that: the molecular chain of the polymer is oriented in the longitudinal direction of the hollow fiber membrane; and at the same time internal distortion of oriented non-crystalline chains, which is disadvantageous in terms of entropy, is alleviated.

6 Claims, 3 Drawing Sheets

(51) Int. Cl.
  *B01D 71/32*   (2006.01)
  *B01D 67/00*   (2006.01)
  *B01D 71/34*   (2006.01)
  *H01M 2/16*   (2006.01)
  *H01M 8/0239*   (2016.01)

(52) U.S. Cl.
  CPC ............ *B01D 69/02* (2013.01); *B01D 69/08* (2013.01); *B01D 69/085* (2013.01); *B01D 71/32* (2013.01); *B01D 71/34* (2013.01); *B01D 2325/04* (2013.01); *B01D 2325/20* (2013.01); *B01D 2325/22* (2013.01); *B01D 2325/24* (2013.01); *H01M 2/1653* (2013.01); *H01M 8/0239* (2013.01)

(56) References Cited

U.S. PATENT DOCUMENTS

| | | | | |
|---|---|---|---|---|
| 8,205,754 | B2* | 6/2012 | Hanakawa | B01D 67/0009 210/490 |
| 9,901,883 | B2* | 2/2018 | Hanakawa | B01D 69/02 |
| 2003/0094409 | A1* | 5/2003 | Minegishi | B01D 61/145 210/500.23 |
| 2005/0258101 | A1* | 11/2005 | Minegishi | B01D 61/145 210/650 |
| 2006/0178480 | A1* | 8/2006 | Tada | B01D 67/003 525/199 |
| 2007/0090051 | A1* | 4/2007 | Minegishi | B01D 61/145 210/651 |
| 2008/0156722 | A1* | 7/2008 | Suzuki | B01D 67/0011 210/500.36 |
| 2009/0206035 | A1* | 8/2009 | Takahashi | B01D 67/0018 210/636 |
| 2009/0261034 | A1* | 10/2009 | Takahashi | B01D 63/024 210/500.23 |
| 2014/0008292 | A1* | 1/2014 | Wang | B01D 61/002 210/500.23 |

FOREIGN PATENT DOCUMENTS

| | | |
|---|---|---|
| JP | 2006-297383 A | 11/2006 |
| JP | 2008-105016 A | 5/2008 |
| JP | 4885539 B2 | 2/2012 |
| WO | WO 03/031038 A1 | 4/2003 |
| WO | WO 2004/081109 A1 | 9/2004 |
| WO | WO 2007/010832 A1 | 1/2007 |
| WO | WO 2016/104743 A1 | 6/2016 |

OTHER PUBLICATIONS

Written Opinion of the International Searching Authority, issued in PCT/JP2016/068878, PCT/ISA/237, dated Sep. 13, 2016.

* cited by examiner

10 μm

10 μm

POROUS HOLLOW FIBER MEMBRANE

TECHNICAL FIELD

The present invention relates to a porous hollow-fiber membrane for use in the water treatment field, the pharmaceutical and medical field, the fermentation industry field, the food industry field, etc.

BACKGROUND ART

In recent years, a porous membrane is utilized in a variety of areas, for example, a water treatment field such as water purification treatment and wastewater treatment, a pharmaceutical and medical field such as drug manufacture and blood purification, a fermentation industry field, a food industry field, a battery separator, a charged membrane, and an electrolyte membrane for fuel cells.

Among others, in the drinking water production field and industrial water production field, i.e., in the water treatment field such as usages for water purification treatment, wastewater treatment and seawater desalination, a porous membrane is used as an alternative to conventional sand filtration, coagulating sedimentation and evaporation methods or for enhancing the quality of treated water. In these fields, since the amount of water to be treated is large, a porous membrane with excellent water permeation performance makes it possible to reduce the membrane area, save the equipment cost due to a compact apparatus, and is advantageous in view of membrane exchange cost or installation area.

As the porous membrane for water treatment, a membrane appropriate to the size of a separation target substance contained in the water to be treated is used. Usually, natural water contains many suspended components, and a separation membrane such as microfiltration membrane or ultrafiltration membrane for the removal of suspended components in water is therefore used in general.

In the water treatment, for the purpose of sterilizing permeate or preventing biofouling of separation membrane, a sterilizer such as sodium hypochlorite may be added to the portion of separation membrane module, or as the chemical cleaning of separation membrane, the separation membrane may be washed with an acid such as hydrochloric acid, citric acid and oxalic acid, an alkali such as aqueous sodium hydroxide solution, chlorine, a surfactant, etc. Accordingly, a separation membrane using, as a material having high chemical resistance, a fluororesin-based polymer typified by polyvinylidene fluoride has been recently developed and utilized.

In the water purification treatment field, a problem of a chlorine-resistant pathogenic microorganism such as *cryptosporidium* getting mixed in with drinking water has been manifested since late 20th century, and it is required for the porous hollow-fiber membrane to have high strength so that no mixing of raw water is caused by membrane breakage.

In order to obtain a porous hollow-fiber membrane having high water permeation performance, high strength/elasticity, and high chemical resistance, various methods have been heretofore proposed.

For example, Patent Document 1 discloses a melt-extraction method. In Patent Document 1, two kinds of fluororesin-based polymers differing in the weight average molecular weight are used and after adding a plasticizer and a good solvent thereto, the resulting mixture is melt-extruded into a hollow-fiber membrane shape, cooled/solidified, subjected to extraction of the plasticizer, and stretched to obtain a porous hollow-fiber membrane in which a mixture of a crystal oriented portion and a crystal unoriented portion is observed.

Patent Document 2 discloses a method in which a fluororesin-based polymer solution containing a fluororesin-based polymer and a poor solvent therefor and being at a temperature not less than the phase separation temperature is discharged into a cooling bath at a temperature not more than the phase separation temperature and solidified to obtain a hollow-fiber membrane.

Furthermore, in Patent Document 3, a fibrous texture having a diameter of 0.9 µm to 3 µm and being oriented in the length direction of a porous hollow-fiber membrane including a fluororesin-based polymer accounts for 30% or more of the entire porous hollow-fiber membrane, whereby a porous hollow-fiber membrane excellent in strength and pure-water permeation performance is obtained.

BACKGROUND ART DOCUMENTS

Patent Documents

Patent Document 1: Japanese Patent No. 4,885,539
Patent Document 2: WO 2003/031038
Patent Document 3: JP-A-2006-297383

SUMMARY OF THE INVENTION

Problem that the Invention is to Solve

It is difficult for the porous hollow-fiber membrane of Patent Document 1 to realize high strength while maintaining practical pure-water permeation performance. The porous hollow-fiber membranes obtained in Patent Documents 2 and 3 have enhanced strength but suffer from the following problems.

In the case of a porous hollow-fiber membrane for water treatment, hot water disinfection (usually at 80° C. for 1 hour) or steam sterilization (usually at 121° C. for 20 minutes) of the inside of the separation membrane module is sometimes performed before use so as to prevent bacterial contamination of the permeate. The present inventors have found that in the conventional module, disinfection or sterilization sometimes reduces the water permeation performance or separation performance.

Furthermore, the present inventors have found that: as a result of decrease in fiber loosening due to fiber shrinkage upon heating, the range of membrane motion is reduced and thus the membrane surface is not sufficiently cleaned by physical cleaning such as air bubbling, resulting in lower water permeation performance; and the shrinkage causes breakage of some fibers, resulting in lower separation performance.

On the other hand, if the module processing is performed by excessively loosening the fiber so as to prevent lowering of these performances, the membrane filling rate per module decreases and therefore, the amount of water that can be processed is reduced.

Taking into account the problems of the conventional techniques above, an object of the present inventors is to provide a hollow-fiber membrane containing a fluororesin-based polymer with high chemical resistance, which is a porous hollow-fiber membrane having high strength and reduced shrinkage due to heat.

Means for Solving the Problems

In order to reduce fiber shrinkage on heating, a shrinkage stress in the longitudinal direction at the time of heating, which acts as a resisting force against shrinkage, needs to be increased. In general, it is difficult to directly measure the fiber shrinkage stress, but the present inventors have found that a porous hollow-fiber membrane in which the stress at 5% elongation (F5 value) at high temperature is equal to or more than a certain level, has excellent thermal deformation resistance.

In addition, as a method for increasing the F5 value at high temperature, the present inventors have discovered a method where with respect to a porous hollow-fiber membrane containing a fluororesin-based polymer, a stretching step and a relaxing step are provided to the production method to form a columnar texture oriented in a longitudinal direction of the porous hollow-fiber membrane and while orienting a molecular chain of the polymer in the longitudinal direction of the porous hollow-fiber membrane, an entropically unfavorable internal strain of an oriented amorphous chain is relieved. As a result, it has been found that the strength and thermal deformation resistance of the porous hollow-fiber membrane can be enhanced while maintaining the high pure-water permeation performance. The present invention has been accomplished based on these findings.

Accordingly, the present invention provides the following technology:

[1] A porous hollow-fiber membrane comprising a fluororesin-based polymer,
in which the porous hollow-fiber membrane has a columnar texture oriented in a longitudinal direction of the porous hollow-fiber membrane,
a stress at 5% elongation (F5 value) in the longitudinal direction at 80° C. is 6.5 MPa or more, and
the F5 value in the longitudinal direction at 121° C. is 5.0 MPa or more.

[2] The porous hollow-fiber membrane according to [1], in which the F5 value in the longitudinal direction at 25° C. is 11 MPa or more.

[3] The porous hollow-fiber membrane according to [1] or [2], in which a loss modulus (E″)-temperature curve obtained in a dynamic viscoelasticity test (temperature dependency test) has a peak and the temperature at the peak is from 65 to 80° C.

[4] The porous hollow-fiber membrane according to any one of [1] to [3], in which a porosity is from 40 to 90%.

[5] The porous hollow-fiber membrane according to any one of [1] to [4], wherein
a molecular chain of the fluororesin-based polymer is oriented in the longitudinal direction of the porous hollow-fiber membrane, and
an orientation degree π of the molecular chain calculated based on the following formula (1) from a half-width H (°) obtained by wide-angle X-ray diffraction determination is 0.4 or more and less than 1.0:

$$\text{Orientation degree } \pi=(180°-H)/180° \quad (1)$$

(provided that H is a half-width of an intensity distribution obtained by circumferentially scanning a crystal peak in the wide-angle X-ray diffraction determination).

[6] A method for producing a porous hollow-fiber membrane, the method including the following steps 1) to 3):
1) a step of forming a hollow fiber having a columnar texture which is oriented in a longitudinal direction of the porous hollow-fiber and has a thickness uniformity of 0.60 or more and less than 1.00, from a membrane forming solution containing a fluororesin-based polymer by thermally induced phase separation;

2) a step of stretching the porous hollow-fiber obtained in the step 1) at a stretch ratio of 1.8 to 4.0 times in a longitudinal direction; and
3) a step of relaxing the porous hollow-fiber membrane obtained in the step 2) at a relax ratio of 0.70 to 0.95 times in the longitudinal direction.

[7] The method for producing a porous hollow-fiber membrane according to [6], in which the relaxing step in 3) is performed at 50 to 125° C.

Advantage of the Invention

According to the present invention, a porous hollow-fiber membrane exhibiting excellent chemical durability owing to a fluororesin-based polymer with high chemical resistance and at the same time, having all of excellent physical durability, thermal deformation resistance and high pure-water permeation performance is provided.

BRIEF DESCRIPTION OF THE INVENTION

MODE FOR CARRYING OUT THE INVENTION

Figure 1:
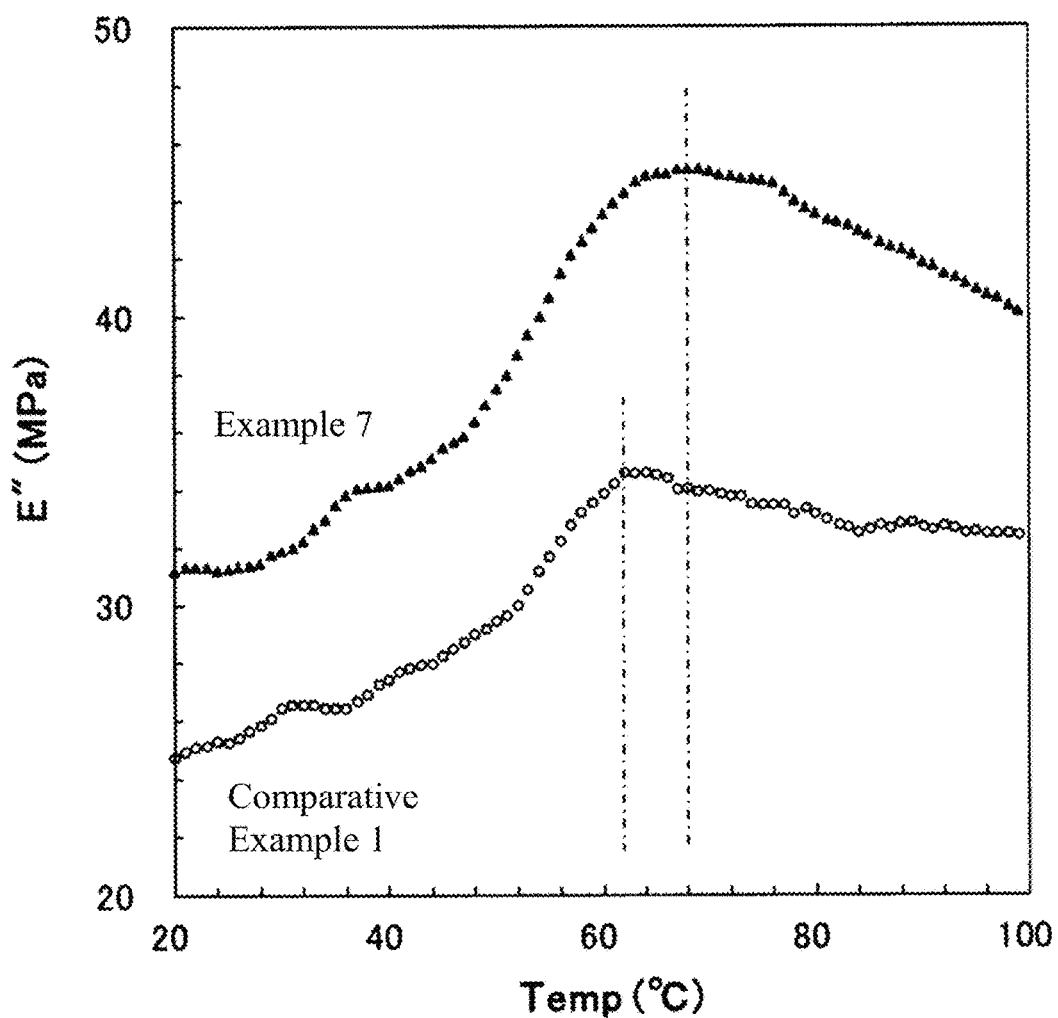
FIG. 1 is a diagram showing the results of a dynamic viscoelasticity test (temperature dependency test) of porous hollow-fiber membranes of Example 7 and Comparative Example 1.
Figure 2:
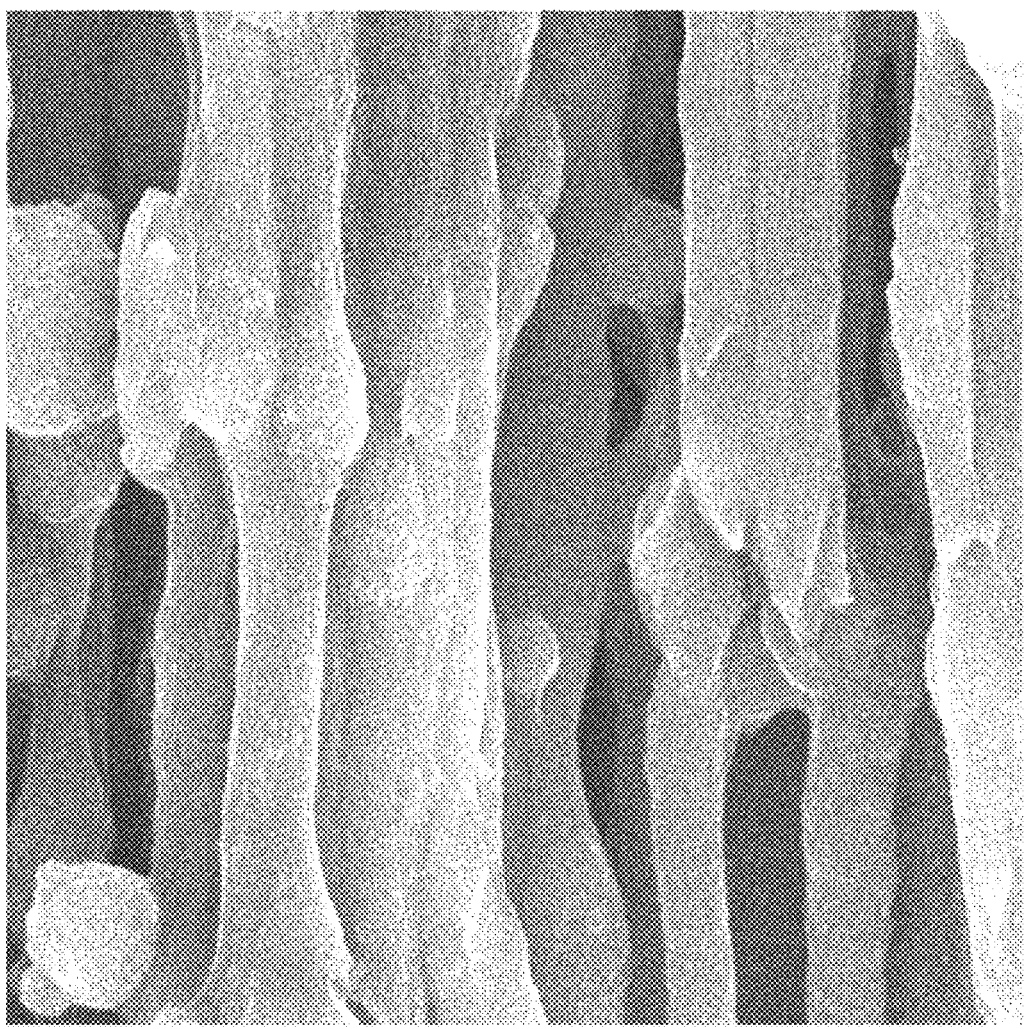
FIG. 2 is a diagram showing a longitudinal cross-sectional photograph of the porous hollow-fiber membrane of Example 7.
Figure 3:
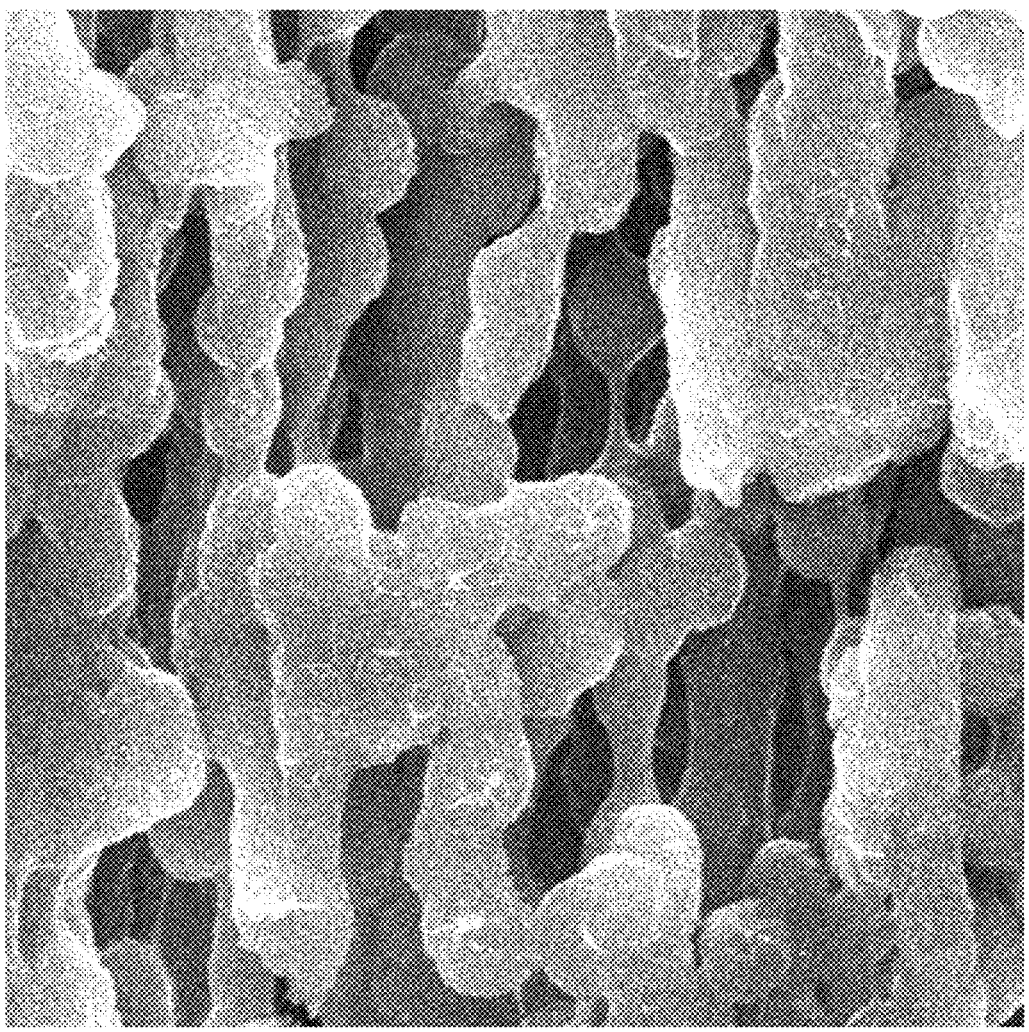
FIG. 3 is a diagram showing a longitudinal cross-sectional photograph of the porous hollow-fiber membrane of Comparative Example 1.

1. Porous Hollow-Fiber Membrane
(1-1) Fluororesin-Based Polymer

The porous hollow-fiber membrane of the present invention includes a fluororesin-based polymer.

The fluororesin-based polymer as used herein means a resin containing a vinylidene fluoride homopolymer and/or a vinylidene fluoride copolymer. The fluororesin-based polymer may contain more than one kind of vinylidene fluoride copolymers.

The vinylidene fluoride copolymer is a polymer having a vinylidene fluoride residue structure and is typically a copolymer of a vinylidene fluoride monomer with another fluorine-based monomer, etc. Examples of such a copolymer include a copolymer of vinylidene fluoride with one or more kinds of monomers selected from vinyl fluoride, tetrafluoroethylene, hexafluoropropylene and chlorotrifluoroethylene.

In addition, a monomer other than the above-described fluorine-based monomer, for example, ethylene, may be copolymerized to an extent not impairing the effects of the present invention. The weight average molecular weight of the fluororesin-based polymer may be appropriately selected according to the strength and water permeation performance required for the polymer separation membrane, but as the weight average molecular weight is larger, the water permeation performance is reduced, and as the weight average molecular weight is smaller, the strength is reduced. For this reason, the weight average molecular weight of the fluororesin-based polymer is preferably from 50,000 to 1,000,000. In the case of a water treatment application where the polymer separation membrane is subject to chemical cleaning, the weight average molecular weight is preferably from 100,000 to 700,000, more preferably from 150,000 to 600,000.

The porous hollow-fiber membrane preferably contains the fluororesin-based polymer as a main component. Containing the fluororesin-based polymer as a main component means that the proportion of the fluororesin-based polymer in the porous hollow-fiber membrane is 50 wt % or more. The proportion of the fluororesin-based polymer in the porous hollow-fiber membrane is preferably 80 wt % or more, more preferably 90 wt % or more, still more preferably 95 wt % or more. The porous hollow-fiber membrane may be composed of only the fluororesin-based polymer.

(1-2) Stress at 5% Elongation (F5 Value)

The porous hollow-fiber membrane of the present invention shows, in the longitudinal direction of the membrane, an F5 value of 6.5 MPa or more at 80° C. and shows an F5 value of 5.0 MPa or more at 121° C.

The temperature of 80° C. is a temperature suitable for hot water disinfection, and 121° C. is a temperature suitable of steam sterilization. It is considered that when the F5 value satisfies the ranges above, a shrinkage stress enough to resist heat shrinkage is obtained in each of disinfection and sterilization. As a result, shrinkage of the membrane can be reduced.

The F5 value at 80° C. is preferably 6.9 MPa or more, and the F5 value at 121° C. is preferably 5.2 MPa or more. The upper limit is not particularly limited but may be 15 MPa or less at 80° C. and may be 11 MPa or less at 121° C.

The F5 value at 25° C. is preferably 11 MPa or more, more preferably 12 MPa or more. The upper limit thereof is not particularly limited but may be 25 MPa or less at 25° C.

In order to increase the measurement accuracy, it is preferable to deter nine the F5 value on arbitrary 5 or more, preferably 10 or more, membrane pieces and use an average value thereof.

(1-3) Peak Temperature of Loss Modulus (E")-Temperature Curve

In the porous hollow-fiber membrane of the present invention, it is preferred that the loss modulus (E")-temperature curve obtained by conducting a dynamic viscoelasticity test (temperature dependency test) for the longitudinal direction of the membrane has a peak and the peak temperature is from 65 to 80° C.

The peak of the loss modulus (E")-temperature curve around this temperature region (from 30 to 90° C.) is considered to correspond to motion of an amorphous chain of the fluororesin-based polymer, which is constrained by microcrystals. The amorphous chain constrained by microcrystals rarely moves at a low temperature outside this temperature region, but its mobility rapidly increases around the peak temperature above.

The fact that the peak temperature is high, i.e., the amorphous chain constrained by microcrystals rarely moves means that the degree of constraint on the amorphous chain is large. In the porous hollow-fiber membrane of the present invention, the peak temperature of the loss modulus (E")-temperature curve is present at a high temperature of 65 to 80° C., and this implies that the degree of constraint imposed on an amorphous chain by microcrystals is large and the mobility is low, as a result, heat shrinkage of the membrane can be reduced.

The peak temperature of the loss modulus (E")-temperature curve is preferably from 66 to 80° C., more preferably from 67 to 80° C., still more preferably from 68 to 80° C.

In order to increase the measurement accuracy, it is preferable to determine the peak temperature of the loss modulus (E")-temperature curve on arbitrary 3 or more, preferably 5 or more, membrane pieces and use an average value thereof.

(1-4) Orientation of Molecular Chain

In the porous hollow-fiber membrane above, the molecular chain of the fluororesin-based polymer is oriented in the longitudinal direction of the porous hollow-fiber membrane. The orientation degree π of the molecular chain is preferably 0.4 or more and less than 1.0. The orientation degree π is calculated from a half-width H (°) obtained by wide-angle X-ray diffraction determination, based on the following formula (1):

$$\text{Orientation degree } \pi = (180° - H)/180° \quad (1)$$

(provided that H is a half-width of the intensity distribution obtained by circumferentially scanning a crystal peak in the wide-angle X-ray diffraction determination).

The orientation of the molecular chain in the longitudinal direction of the porous hollow-fiber membrane and the method for measuring the orientation degree π are specifically described below.

In order to calculate the orientation degree π, the porous hollow-fiber membrane is fixed to a sample stage by arranging its longitudinal direction to run vertically and irradiated by an X-ray beam perpendicularly to the longitudinal direction of the porous hollow-fiber membrane. Here, the short-side direction of the porous hollow-fiber membrane is a direction perpendicular to the longitudinal direction.

In the case where the molecular chain is unoriented, a ring-like diffraction peak is observed throughout an azimuth angle of 360°. On the other hand, in the case where the molecular chain is oriented in the longitudinal direction of the porous hollow-fiber membrane, when irradiated by X-ray perpendicularly to the longitudinal direction, a diffraction peak is observed on an azimuth angle in the short-side direction (on the equatorial line) around 2θ=20°. The diffraction peak around 2θ=20° indicates a distance between polymer molecular chains.

The value of 2θ differs depending on the polymer structure or polymer blending and may range from 15 to 30°. For example, when the fluororesin-based polymer is a polyvinylidene fluoride homopolymer and has α crystal or β crystal, a diffraction peak derived from a (110) plane of α crystal or β crystal, i.e., a plane parallel to the molecular chain, is observed around 2θ=20.4°.

The intensity distribution in the azimuth angle direction is obtained by fixing the value of 2θ and furthermore, measuring the intensity from 0° to 360° in the azimuth angle direction (circumferential direction), and the obtained result is the intensity distribution determined by scanning the crystal peak in the circumferential direction. Here, in the case where the ratio between the intensity at an azimuth angle of 180° and the intensity at an azimuth angle of 90° is 0.83 or less or is 1.20 or more, it is regarded that a peak is present, and in the intensity distribution in this azimuth angle direction, the width at a position of half the peak height (half-width H) is determined.

The orientation degree π is calculated by substituting the half-width H into formula (1).

In the porous hollow-fiber membrane of the present invention, the orientation degree π of the molecular chain in the longitudinal direction of the porous hollow-fiber membrane is preferably 0.4 or more and less than 1.0, more preferably 0.5 or more and less than 1.0, still more preferably 0.6 or more and less than 1.0. When the orientation π is 0.4 or more, the strength of the porous hollow-fiber membrane increases.

In the intensity distribution determined by scanning the crystal peak in the circumferential direction, when the ratio between the intensity at an azimuth angle of 180° and the intensity at an azimuth angle of 90° is more than 0.83 and less than 1.20, it is regarded that a peak is absent. That is, in this case, the fluororesin-based polymer is determined to be unoriented.

In the case where the hollow-fiber membrane contains α crystal or β crystal of polyvinylidene fluoride, the half-width H is preferably a half-width obtained using an intensity distribution determined by circumferentially scanning the crystal peak)(2θ=20.4° derived from a (110) plane of the α crystal or β crystal above in wide-angle X-ray diffraction determination.

(1-5) Columnar Texture

The porous hollow-fiber membrane has a columnar texture oriented in the longitudinal direction of the porous hollow-fiber membrane.

The "columnar texture" is a solid material having an aspect ratio (longitudinal length/short-side length) of 3 or more. Here, the "longitudinal length" indicates the length in the longitudinal direction of the columnar texture. The "short-side length" is an average length in the short-side direction of the columnar texture. The average length is determined by measuring the length in the short-side direction at arbitrary 20 points or more, preferably 30 points or more, in one columnar texture and calculating an average value thereof.

In addition, the columnar texture is a solid material containing a fluororesin-based polymer. The columnar texture preferably contains the fluororesin-based polymer as a main component. Containing the fluororesin-based polymer as a main component means that the proportion of the fluororesin-based polymer in the columnar texture is 50 wt % or more. The proportion of the fluororesin-based polymer in the columnar texture is preferably 80 wt % or more, more preferably 90 wt % or more, still more preferably 95 wt % or more. The columnar texture may be composed of only the fluororesin-based polymer.

The "oriented in the longitudinal direction" as used herein means that out of angles made by the longitudinal direction of the columnar texture and the longitudinal direction of the porous hollow-fiber membrane, the acute angle is within 20°.

In the present invention, the short-side length of the columnar texture is preferably from 0.5 μm to 3 μm, because high strength performance and high pure-water permeation performance are achieved. When the short-side length of the columnar texture is 0.5 μm or more, physical strength of the columnar texture itself increases and therefore, high strength is obtained. When the short-side length of the columnar texture is 3 μm or less, the void among columnar textures becomes large and in turn, good pure-water permeation performance is obtained.

As described later, the porous hollow-fiber membrane of the present invention can be produced by forming a hollow fiber from a membrane forming solution containing a polymer and stretching the hollow fiber. For the sake of convenience, the state before stretching is referred to as "hollow fiber", and the state after stretching is referred to as "hollow-fiber membrane".

The thickness uniformity (the later-described average value D) of the columnar texture in the hollow-fiber membrane after stretching is preferably 0.60 or more, more preferably 0.70 or more, still more preferably 0.80 or more, particularly preferably 0.90 or more. Although the thickness uniformity is 1.0 at most, the columnar texture may have a thickness uniformity of less than 1.0.

In the hollow-fiber membrane, the columnar texture has a high thickness uniformity in this way, i.e., the columnar texture has less narrowed portions, and the hollow-fiber membrane thereby exhibits high elongation.

When the porous hollow-fiber membrane after stretching keeps high elongation, this is advantageous in that fiber breakage is less likely to occur even when a load is abruptly applied. The elongation at break of the porous hollow-fiber membrane is preferably 50% or more, more preferably 80% or more.

The thickness uniformity is described below. As the length variation in each short-side direction of the columnar texture is smaller, a narrowed portion is less formed in the columnar texture, leading to a high thickness uniformity, and coming close to a perfect column.

The thickness uniformity of the columnar texture is determined by comparing a first cross-section and a second cross-section each being parallel to the short-side direction of the porous hollow-fiber membrane. This is specifically described below.

First, a first cross-section and a second cross-section being parallel to each other are selected. The distance between the first face and the second face is set to be 5 μm. In each cross-section, a portion including resin and a void portion are distinguished, and the area of the resin portion and the area of the void portion are measured. Next, the area of a portion where when the first cross-section is projected onto the second cross-section, the portion including resin in the first cross-section and the portion including resin in the second cross-section are overlapped, namely, the overlap area, is determined. With respect to arbitrary 20 pairs of first cross-section and second cross-section in one hollow-fiber membrane, thickness uniformities A and B are determined based on the following formulae (2) and (3), respectively:

$$\text{Thickness uniformity } A = (\text{overlap area})/(\text{area of resin portion of second cross-section}) \quad (2)$$

$$\text{Thickness uniformity } B = (\text{overlap area})/(\text{area of resin portion of first cross-section}) \quad (3)$$

That is, 20 pairs of thickness uniformities A and B are obtained for one hollow-fiber membrane. A larger value means that the thickness of the columnar texture is more uniform. Next, with respect to each pair, an average value C of thickness uniformities A and B is calculated. That is, 20 average values C are obtained for one hollow-fiber membrane. With respect to these average values C, an average value D is further calculated. The average value D is the thickness uniformity of this hollow-fiber membrane.

In the case where 80% or more of 20 average values C calculated for one hollow-fiber membrane are 0.60 or more, the hollow-fiber membrane can be said to have a columnar texture.

In measuring the thickness uniformity, in order to clearly distinguish the resin portion and the void portion, it is preferable to previously perform resin-embedding of the porous hollow-fiber membrane in an epoxy resin, etc. and dyeing treatment of the epoxy resin, etc. with osmium, for example. By such resin embedding/dyeing treatment, the void portion is filled with an epoxy resin, etc., and at the time of cross-sectional processing with a focused ion beam described later, the portion including a fluororesin-based polymer and the void portion (i.e., the epoxy resin portion) can be clearly distinguished, leading to high observation accuracy.

Furthermore, in order to obtain the above-described first cross-section and second cross-section each being parallel to the short-side direction of the porous hollow-fiber membrane, a scanning electron microscope (SEM) equipped with a focused ion beam (FIB) is preferably used. A face parallel to the short-side direction of the porous hollow-fiber membrane is cut out using FIB, and FIB cutting and SEM observation are repeatedly conducted 200 times at 50 nm intervals toward the longitudinal direction of the porous hollow-fiber membrane.

By such continuous cross-section observation, information at a depth of 10 μm can be obtained. Arbitrary first and second cross-sections being parallel to each other and being spaced 5 μm apart are selected therefrom, and the thickness uniformities can be determined using formulae (2) and (3). The observation magnification may be sufficient if it is a magnification enabling clear identification of a columnar texture and a spherical texture, and, for example, a magnification of 1,000 to 5,000 times may be used.

(1-6) Porosity

In the porous hollow-fiber membrane of the present invention, in order to satisfy both high pure-water permeation performance and high strength, the porosity is preferably from 40 to 90%, more preferably from 50 to 80%, still more preferably from 50 to 70%. If the porosity is less than 40%, the pure-water permeation performance is deteriorated, whereas if it exceeds 90%, the strength significantly decreases and in turn, the membrane lacks suitability as a porous hollow-fiber membrane for water treatment.

The porosity of the porous hollow-fiber membrane is determined according to the following formula (4) by using the area of the resin portion and the area of the void portion in the above-described cross-section. In order to increase the accuracy, it is preferable to determine the porosity for arbitrary 20 or more, preferably 30 or more, cross-sections and use an average value thereof.

$$\text{Porosity (\%)}=100\times(\text{area of void portion})/\{(\text{area of resin portion})+(\text{area of void portion})\} \quad (4)$$

(1-7) Others

The porous hollow-fiber membrane of the present invention may contain a texture other than the above-described columnar texture, to the extent not deviating from the object of the present invention. The structure other than the columnar texture includes, for example, a spherical texture having an aspect ratio (longitudinal length/short-side length) of less than 3. In the case of containing a spherical texture, when a spherical texture having a short-side length and a longitudinal length in the range of 0.5 to 3 μm is used, reduction in the strength is prevented, and good pure-water permeation performance is maintained.

However, if the proportion of such a spherical texture in the porous hollow-fiber membrane becomes large, it is likely that spherical textures are increasingly linked each other and the narrowed portion is increased, making it difficult to perform high-ratio stretching or keep the elongation after stretching. For this reason, a smaller proportion of spherical texture in the porous hollow-fiber membrane is more preferred. The proportion is preferably less than 20%, more preferably less than 10%, still more preferably less than 1%, and it is best if a spherical texture is not present at all.

Here, the occupancy (%) of each texture is determined according to the following formula (5) by taking a photograph of a cross-section in the longitudinal direction of the porous hollow-fiber membrane by means of SEM, etc. at a magnification enabling clear identification of a columnar texture and a spherical texture, preferably at a magnification of 1,000 to 5,000 times. In order to increase the accuracy, it is preferable to determine the occupancy for arbitrary 20 or more, preferably 30 or more, cross-sections and calculate an average value thereof.

$$\text{Occupancy (\%) of each texture}=\{(\text{area occupied by each texture})/(\text{area of entire photograph})\}\times 100 \quad (5)$$

Incidentally, the area of the entire photograph and the area occupied by a texture can be determined preferably by employing a method of converting the area into a weight corresponding to each texture photographed. That is, after the photograph taken is printed on paper, the weight of paper corresponding to the entire photograph and the weight of paper corresponding to a texture portion cut out therefrom may be measured. In advance of SEM photographing, the above-described resin embedding/dyeing treatment and FIB cutting are preferably applied, because the observation accuracy becomes high.

In the porous hollow-fiber membrane of the present invention, it is preferred that the pure-water permeation performance at 50 kPa and 25° C. is 0.7 m$^3$/m$^2$/hr or more and the breaking strength is 25 MPa or more, and it is more preferred that the pure-water permeation performance at 50 kPa and 25° C. is 0.7 m$^3$/m$^2$/hr or more and the breaking strength is 30 MPa or more.

Above all, from the viewpoint of forming a high-performance hollow-fiber membrane satisfying both high pure-water permeation performance and high strength performance, it is preferred that the pure-water permeation performance at 50 kPa and 25° C. is from 0.7 to 5.0 m$^3$/m$^2$/hr and the breaking strength is from 25 to 70 MPa, and it is more preferred that the pure-water permeation performance at 50 kPa and 25° C. is from 0.7 to 5.0 m$^3$/m$^2$/hr and the breaking strength is from 30 to 70 MPa.

The measurement of pure-water permeation performance is made by manufacturing a 200 mm-long miniature module including 4 porous hollow-fiber membranes. External-pressure dead-end filtration of reverse osmosis membrane filtrate is performed for 10 minutes under the conditions of a temperature of 25° C. and a filtration pressure difference of 16 kPa, and the permeation amount (m$^3$) is determined. The permeation amount (m$^3$) is converted into a value per unit time (hr) and effective membrane area (m$^2$) and further multiplied by (50/16), thereby being converted into a value at a pressure of 50 kPa to determine the pure-water permeation performance.

The methods for measuring the breaking strength and the elongation at break are not particularly limited but, for example, using a tensile tester, a tensile test of a sample having a measurement length of 50 mm is performed 5 or more times at a tensile speed of 50 mm/min by changing the sample, and the breaking strength and the elongation at break can be measured by determining average values thereof.

In the porous hollow-fiber membrane of the present invention, the heat shrinkage rate at 80° C. is preferably 10% or less, more preferably 6% or less, still more preferably 1% or less. In addition, the heat shrinkage rate at 121° C. is preferably 25% or less, more preferably 20% or less, still more preferably 15% or less, particularly preferably 5% or less.

The heat shrinkage rate at 80° C. or 121° C. of the porous hollow-fiber membrane can be determined, for example, as follows, as described in Examples. First, a porous hollow-fiber membrane stored at 25° C. is cut out into a length of 200 mm in the longitudinal direction, and a marked line is drawn at intervals of 150 mm in the longitudinal direction of the sample. The sample was left to stand still for 1 hour under no tension in a warm water bath at 80° C., thereby performing a heat treatment, and then cooled to 25° C., and the distance between marked lines is measured. Also, the sample was left to stand still for 20 minutes under no tension in an autoclave at 121° C., thereby performing a heat treatment, and then cooled to 25° C., and the distance between marked lines is measured. The heat shrinkage rate at each temperature can be determined from a change in the marked line-to-marked line distance between before and after heat treatment, according to the following formula (6):

Heat shrinkage rate (%)={1−(distance between marked lines after heat treatment at 80° C. or 121° C.)/(distance between marked lines before heat treatment)}×100     (6)

The dimension and shape of the porous hollow-fiber membrane are not limited to a specific configuration, but specifically, the outside diameter is preferably from 0.3 mm to 3.0 mm.

The porous hollow-fiber membrane described above has sufficient pure-water permeation performance, strength and elongation for various water treatments such as drinking water production, industrial water production, water purification treatment, wastewater treatment, seawater desalination and industrial water production.

2. Production Method of Porous Hollow-Fiber Membrane

The method for producing the porous hollow-fiber membrane of the present invention is described below by way of example. The method for producing a porous hollow-fiber membrane includes at least:

1) a step of forming a hollow fiber having a columnar texture which is oriented in the longitudinal direction of the porous hollow-fiber and has a thickness uniformity of 0.60 or more and less than 1.00, from a membrane forming solution containing a fluororesin-based polymer by thermally induced phase separation;

2) a step of stretching the porous hollow-fiber obtained in 1) above at a stretch ratio of 1.8 to 4.0 times in a longitudinal direction thereof; and 3) a step of relaxing the porous hollow-fiber membrane obtained in 2) above at a relax ratio of 0.70 to 0.95 times in the longitudinal direction thereof.

(2-1) Preparation of Membrane Forming Solution

The production method of a porous hollow-fiber membrane in this embodiment further includes a step of preparing a membrane forming solution containing a fluororesin-based polymer. A fluororesin-based polymer solution (i.e., a membrane forming solution) is prepared by dissolving a fluororesin-based polymer in a poor or good solvent for the fluororesin-based polymer at a relatively high temperature of not less than the crystallization temperature.

When the polymer concentration in the membrane forming solution is high, a porous hollow-fiber membrane having high strength is obtained. On the other hand, when the polymer concentration is low, the porosity of the porous hollow-fiber membrane becomes large, and the pure-water permeation performance is enhanced. Accordingly, the concentration of the fluororesin-based polymer is preferably from 20 to 60 wt %, more preferably from 30 to 50 wt %.

In the present specification, the poor solvent is defined as a solvent in which the fluororesin-based polymer cannot be dissolved in a concentration of 5 wt % or more at a low temperature of 60° C. or less but can be dissolved in a concentration of 5 wt % or more in a high-temperature region between 60° C. or more and not more than the melting point of the fluororesin-based polymer (for example, when the polymer is composed of a vinylidene fluoride homopolymer alone, about 178° C.).

In the present specification, the good solvent is defined as a solvent in which the fluororesin-based polymer can be dissolved in a concentration of 5 wt % or more even in a low-temperature region of 60° C. or less, and the non-solvent is defined as a solvent in which the fluororesin-based polymer is neither dissolved nor swollen at a temperature up to the melting point of the fluororesin-based polymer or the boiling point of the solvent.

The poor solvent for the fluororesin-based polymer includes, for example, cyclohexanone, isophorone, γ-butyrolactone, methyl isoamyl ketone, propylene carbonate, dimethyl sulfoxide, and a mixed solvent thereof.

The good solvent includes, for example, N-methyl-2-pyrrolidone, dimethylacetamide, dimethylformamide, methyl ethyl ketone, acetone, tetrahydrofuran, tetramethylurea, trimethyl phosphate, and a mixed solvent thereof. The non-solvent includes, for example, water, hexane, pentane, benzene, toluene, methanol, ethanol, carbon tetrachloride, o-dichlorobenzene, trichloroethylene, ethylene glycol, diethylene glycol, triethylene glycol, propylene glycol, butylene glycol, pentanediol, hexanediol, an aliphatic hydrocarbon such as low-molecular-weight polyethylene glycol, an aromatic hydrocarbon, an aliphatic polyhydric alcohol, an aromatic polyhydric alcohol, a chlorinated hydrocarbon, other chlorinated organic liquids, and a mixed solvent thereof.

(2-2) Formation of Hollow Fiber

In the hollow fiber forming step, a hollow fiber is obtained from a membrane forming solution containing a fluororesin-based polymer by utilizing a thermally induced phase separation method of inducing phase separation by temperature change. In order to perform the later-described stretching at a high stretch ratio of 1.8 times or more, it is preferred that the hollow fiber has a columnar texture oriented in its longitudinal direction and the thickness uniformity of the columnar texture is 0.60 or more, preferably 0.70 or more, more preferably 0.80 or more, still more preferably 0.90 or more.

In the thermally induced phase separation method, two kinds of phase separation mechanisms are mainly utilized. One is a liquid-liquid separation method in which a polymer solution dissolved uniformly at a high temperature is separated into a polymer thick phase and a polymer thin phase due to reduction in the dissolving ability of the solution during a temperature drop and the structure is thereafter fixed by crystallization. Another is a solid-liquid phase separation method in which a polymer solution dissolved uniformly at a high temperature is phase-separated into a polymer solid phase and a solvent phase due to occurrence of crystallization of the polymer during a temperature drop.

A three-dimensional network structure is mainly formed in the former method, and a spherical structure constituted by a spherical texture is mainly formed in the latter method. In the production of the hollow-fiber membrane of the present invention, the latter phase separation mechanism is preferably utilized. Accordingly, a polymer concentration and a solvent, inducing solid-liquid phase separation, are selected. In the former phase separation mechanism, it is difficult to develop the above-described columnar texture oriented in the longitudinal direction of the hollow-fiber. Because, the polymer thick phase forms a very fine phase by phase separation before the structure is fixed, and cannot be made columnar.

As a specific method, a hollow part-forming liquid is discharged from an inner tube of a dual tube-type spinneret for spinning of a porous hollow-fiber membrane while ejecting the above-described membrane forming solution from an outer tube of the dual tube-type spinneret. The thus-discharged membrane forming solution is cooled and solidified in a cooling bath to obtain a porous hollow-fiber.

The fluororesin-based polymer solution is, before being discharged through the spinneret, held at a specific temperature condition for a predetermined time under pressure. The pressure is preferably 0.5 MPa or more, more preferably 1.0 MPa or more.

The temperature T of the polymer solution preferably satisfies $Tc+35°\ C.\leq T\leq Tc+60°\ C.$, more preferably satisfies $Tc+40°\ C.\leq T\leq Tc+55°\ C.$ Tc is a crystallization temperature of the polymer solution. The time for which the polymer solution is held under these pressure and temperature is preferably 10 seconds or more, more preferably 20 second or more.

Specifically, a retention part for allowing the polymer solution to stay is provided at any site of a solution supply line of supplying the polymer solution to the spinneret, and a pressurizing unit for applying a pressure to the retained polymer solution and a temperature-adjusting unit for adjusting the temperature of the retained polymer solution (for example, a heating unit) are provided.

The pressurizing unit is not particularly limited, but by disposing two or more pumps in the solution supply line, a pressure can be applied to any site therebetween. The pump includes, for example, a piston pump, a plunger pump, a diaphragm pump, a wing pump, a gear pump, a rotary pump, and a screw pump, and two or more kinds of pumps may be used.

Through this step, a pressure is applied under the conditions in which crystallization easily takes place, it is presumed that crystal growth has anisotropy and in turn, not an isotropic spherical structure but a texture oriented in the longitudinal direction of the porous hollow-fiber is developed, as a result, a columnar structure is obtained.

Here, the crystallization temperature Tc of the fluororesin-based polymer solution is defined as follows. A rise temperature of a crystallization peak observed in the process, in which an apparatus for differential scanning calorimetry (DSC measurement) is used, a mixture having the same composition as the composition of the membrane-forming polymer formulated solution containing a fluororesin-based polymer, a solvent, etc. is mixed in a sealing-type DSC container, the mixture is uniformly dissolved by raising the temperature to a dissolution temperature at a temperature rise rate of 10° C./min and the temperature is hold for 30 minutes, and then lowered at a temperature drop rate of 10° C./min, is Tc.

The cooling bath for cooling the fluororesin-based polymer solution discharged through the spinneret is described below. In the cooling bath, a mixed liquid including a poor or good solvent at a concentration of 50 to 95 wt % and a non-solvent at a concentration of 5 to 50 wt % is preferably used. As the poor solvent, the same poor solvent as that for the polymer solution is preferably employed.

For the hollow part-forming liquid, as with the cooling bath, a mixed liquid including a poor or good solvent at a concentration of 50 to 95 wt % and a non-solvent at a concentration of 5 to 50 wt % is preferably used. As the poor solvent, the same poor solvent as that for the polymer solution is preferably employed.

Here, in order to develop not a fibrous texture having a large number of narrowed portions but a columnar texture having a uniform thickness, it is preferable to promote polymer uptake/growth into the narrowed portion. The present inventors have found that the polymer uptake/growth into the narrowed portion leads to disappearance of a narrowed portion having high interface energy, and the columnar texture is energetically stabilized and therefore the polymer uptake/growth can be caused to preferentially occur over the growth in portions other than the narrowed portion, and have made intensive studies on the method for enhancing the thickness uniformity.

Consequently, as one method for promoting the polymer uptake/growth into the narrowed portion, a method of performing the cooling/solidification in the cooling bath near the crystallization temperature of the polymer solution and thereby allowing cooling/solidification to slowly proceed has been found. In this case, the temperature Tb of the cooling bath and the crystallization temperature Tc of the polymer solution preferably satisfy $Tc-30°\ C.<Tb\leq Tc$, more preferably $Tc-20°\ C.<Tb\leq Tc$.

The passing time of the cooling bath (i.e., soaking time in the cooling bath) is not particularly limited as long as enough time to complete the thermally induced phase separation including the polymer uptake/growth into the narrowed portion can be ensured, and the passing time may be experimentally determined by taking into account the number of hollow-fiber membranes, the spinning speed, the bath ratio, the cooling capacity, etc.

However, in order to achieve thickness uniformity, the passing time is preferably set to be as long as possible in the above-described temperature range of the cooling bath and may be, for example, 10 seconds or more, preferably 20 seconds or more, more preferably 30 seconds or more.

In addition, two or more stages of cooling may be performed. Specifically, the cooling step may include a step of cooling the solution by using a first cooling bath for increasing the supercooling degree, thereby promoting generation/growth of a crystal nucleus, and a step of thereafter cooling the solution by using a second cooling bath for promoting polymer uptake/growth into the narrowed portion. The cooling step by the second cooling bath utilizes a phenomenon that the polymer uptake/growth into the narrowed portion preferentially occurs mainly in the structure coarsening process of phase separation.

In this case, when the temperature Tb1 of the first cooling bath satisfies $Tb1\leq Tc-30°\ C.$, the generation and growth of a crystal nucleus can be promoted by increasing the supercooling degree, and when the temperature Tb2 of the second cooling bath is set near the crystallization temperature (specifically, set to satisfy $Tc-30°\ C.<Tb2\leq Tc$, more preferably $Tc-20°\ C.<Tb2\leq Tc$), the polymer uptake/growth into the narrowed portion can be promoted. Tc is the crystallization temperature of the polymer solution.

The passing time of each cooling bath can be varied, but it is preferable to, for example, set the passing time of the first cooling bath to be from 1 to 20 seconds, preferably from 3 to 15 seconds, more preferably from 5 to 10 seconds, and the passing time of the second cooling bath to be 10 seconds or more, preferably 20 seconds or more, more preferably 30 seconds or more.

When a texture having a thickness uniformity of less than 0.60 is referred to as "fibrous texture" so as to distinguish it from the columnar texture, the hollow-fiber membrane disclosed in JP-A-2006-297383 (Patent Document 3) is a hollow-fiber membrane having a fibrous texture. A porous hollow-fiber membrane having such a fibrous texture is relatively excellent in strength and pure-water permeation performance, and the present inventors have therefore attempted to increase the strength by stretching this membrane. However, it has been found that the membrane cannot be uniformly stretched and the strength cannot be increased.

In general, a porous membrane used for water treatment has a large number of void parts for passing water and since destruction of the texture proceeds from a void part at the time of stretching, stretching itself is very difficult. This tendency is prominent particularly when the porous hollow-fiber membrane has a phase-separation porous structure obtained by dry-wet spinning utilizing a principle of non-solvent induced phase separation or thermally induced phase separation, because a large number of fine voids are present and the porosity is high.

In the case of the porous membrane having a fibrous texture of JP-A-2006-297383 (Patent Document 3), it is considered that stress during stretching is dispersed by the fibrous texture oriented in the longitudinal direction and stretching can be performed, albeit at a low stretch ratio of less than 1.8 times. However, it is still difficult to uniformly conduct stretching at a high stretch rate of 1.8 times or more, and as a result of intensive studies on the cause thereof, it has been found that a fibrous structure has many narrowed portions and since a stress is concentrated at the narrowed portion during stretching, the narrowed portion is preferentially stretched, as a result, it is impossible to uniformly stretch the entire fibrous texture and in turn, increase the stretch ratio.

On the other hand, the present inventors have found that as long as it is a hollow fiber having a columnar texture with uniform thickness but not a fibrous texture having a large number of narrowed portions described in Patent Document 3, not a network structure described in Patent document 1 and not a spherical structure described in Patent Document 2, the entire columnar texture can be uniformly stretched, and stretching at a high stretch ratio of 1.8 times or more becomes possible. By virtue of such uniform and high-ratio stretching, the present inventors have succeeded in stretching and orienting the molecular chain of a fluororesin-based polymer in the longitudinal direction of a porous hollow-fiber membrane and succeeded in increasing the strength while maintaining high pure-water permeation performance.

(2-3) Stretching

In the present invention, the porous hollow-fiber including a fluororesin-based polymer having a columnar texture, obtained by the method above, is stretched at a high stretch ratio, whereby the molecular chain of the polymer is oriented in the longitudinal direction of the hollow-fiber membrane. The stretch ratio is from 1.8 to 4.0 times, preferably from 2.0 to 3.5 times, more preferably from 2.0 to 3.0 times. If the stretch ratio is less than 1.8 times, the porosity is not sufficiently increased, and if the stretch ratio exceeds 4.0 times, reduction of the elongation increases.

The temperature of the atmosphere during stretching is preferably from 60 to 140° C., more preferably from 70 to 120° C., still more preferably from 80 to 100° C. If the membrane is stretched in a low-temperature atmosphere of less than 60° C., stable and homogeneous stretching is difficult. If the membrane is stretched at a temperature exceeding 140° C., since the temperature is close to the melting point of the fluororesin-based polymer, the structure texture may be melted to reduce the pure-water permeation performance.

Stretching in a liquid is preferred, because the temperature control is easy, but the stretching may be performed in a gas such as steam. As the liquid, water is simple and preferred, but in the case of stretching at about 90° C. or more, use of a low-molecular-weight polyethylene glycol, etc. may also be preferably adopted.

(2-4) Relaxation

In the present invention, the porous hollow-fiber membrane including a fluororesin-based polymer having a columnar texture with the molecular chain being oriented in the longitudinal direction, obtained by the method above, is relaxed, whereby an entropically unfavorable internal strain of an oriented amorphous chain of the molecular chain is relieved and heat shrinkage of the membrane is reduced. When relaxation is performed offline under no tension, the membrane can be sufficiently relaxed, and this is preferred, but relaxation may also be performed on-line between two driving rolls by decelerating the rotational speed of a succeeding driving roll from the rotational speed of a preceding driving roll.

The relax ratio is preferably from 0.70 to 0.95 times, more preferably from 0.70 to 0.90 times, still more preferably from 0.70 to 0.85 times. When the relax ratio is 0.70 time or more, the hollow-fiber membrane can be homogeneously relaxed, and when the relax ratio is 0.95 times or less, the internal strain of an oriented amorphous chain can be sufficiently relieved.

In addition, when the relaxation is performed in a high-temperature atmosphere, this is more effective. The temperature of the atmosphere during relaxation is preferably from 50 to 125° C., more preferably from 80 to 125° C. When the temperature of the atmosphere during relaxation is 50° C. or more, the internal strain of an oriented amorphous chain can be sufficiently relieved. When the temperature of the atmosphere during relaxation is 125° C. or less, the speed at which shrinkage of the membrane proceeds can be kept low and therefore, bending of the membrane can be prevented.

Relaxation in a liquid is preferred, because the temperature control is easy, but relaxation may be performed in a gas such as steam. As the liquid, water is simple and preferred, but in the case of relaxation at about 90° C. or more, use of a low-molecular-weight polyethylene glycol, etc. may also be preferably adopted.

EXAMPLES

The present invention is described below by referring to specific Examples, but the present invention is not limited to these Examples. Incidentally, physical values relating to the present invention can be measured by the following methods.

(1) Pure-Water Permeation Performance

A compact module including 4 porous hollow-fiber membranes and having an effective length of 100 mm was manufactured. Distilled water was supplied to the module over 1 hour under the conditions of a temperature of 25° C. and a filtration pressure difference of 16 kPa, and the amount ($m^3$) of the obtained permeate was measured, converted into a value per unit time (hr) and unit membrane area ($m^2$), further converted in terms of a pressure (50 kPa), and used as the pure-water permeation performance ($m^3/m^2/hr$). The unit membrane area was calculated from the average outside diameter and the effective length of the porous hollow-fiber membrane.

(2) Breaking Strength, Elongation at Break

A porous hollow-fiber membrane was cut out into a length of 110 mm in the longitudinal direction to prepare a sample. Using a tensile tester (TENSILON (registered trademark)/RTG-1210, manufactured by Toyo Baldwin Co., Ltd.), a sample having a measurement length of 50 mm was measured at a tensile speed of 50 mm/min in an atmosphere of 25° C. The measurement was performed 5 or more times by changing the sample, and average values of breaking strength (MPa) and elongation at break (%) were determined.

(3) Stress at 5% Elongation (F5 Value)

A porous hollow-fiber membrane was cut out into a length of 110 mm in the longitudinal direction to prepare a sample. Using a tensile tester (TENSILON (registered trademark)/RTG-1210, manufactured by Toyo Baldwin Co., Ltd.), a sample having a measurement length of 50 mm was measured at a tensile speed of 50 mm/min in an atmosphere of 25° C., 80° C. and 121° C. A value obtained by dividing the tension when the sample was elongated by 5% (when the chuck-to-chuck distance became 52.5 mm), by the cross-sectional area (excluding the hollow part) of the sample before measurement was taken as the F5 value (MPa). The measurement was performed 5 or more times by changing the sample, and an average value thereof was determined.

(4) Peak Temperature of Loss Modulus (E")

A porous hollow-fiber membrane was cut out into a length of 20 mm in the longitudinal direction to prepare a sample. Using a dynamic viscoelasticity measuring apparatus (Rheogel-E4000, manufactured by UBM), the temperature dependency of loss modulus (E") was measured while heating the sample at a temperature rise rate of 2° C./min in the temperature range of 0 to 170° C. in a nitrogen atmosphere. At this time, the measurement length, the frequency, and the tensile strain were set to 10 mm, 1 Hz, and 0.05%, respectively. By plotting the loss modulus (E") on the ordinate axis and the temperature on the abscissa axis, the peak was assigned to the maximum value of the loss modulus (E") in the range of 30 to 90° C., and the corresponding temperature was taken as the peak temperature (° C.) of the loss modulus (E"). The measurement was performed 3 or more times by changing the sample, and an average value thereof was determined.

(5) Orientation Degree π of Molecular Chain in Longitudinal Direction of Porous Hollow-Fiber Membrane A porous hollow-fiber membrane was fixed to a sample stage by arranging its longitudinal direction to run vertically and an X-ray beam perpendicularly to the longitudinal direction of the porous hollow-fiber membrane was irradiated thereto by using an X-ray diffractometer (SmartLab for polymer, manufactured by Rigaku Corporation). Subsequently, the intensity in the range from 0° to 360° in the azimuth angle direction, relative to the diffraction peak around 2θ=20.4°, was measured to obtain an intensity distribution in the azimuth angle direction. Here, it is regarded that a peak was present when the ratio between the intensity at an azimuth angle of 180° and the intensity at an azimuth angle of 90° was 0.83 or less or was 1.20 or more, and by determining the width at a position of half the peak height (half-width H) from the intensity distribution in the azimuth angle direction, the orientation degree π was calculated according to the following formula (1).

$$\text{Orientation degree } \pi = (180° - H)/180° \quad (1)$$

(provided that H is a half-width of an intensity distribution obtained by circumferentially scanning a crystal peak in the wide-angle X-ray diffraction determination).

(6) Longitudinal Length and Short-Side Length of Columnar Texture

A photograph of a cross-section in the longitudinal direction of a porous hollow-fiber membrane was taken at a magnification of 3,000 times by means of a scanning electron microscope (SEM, SU1510, manufactured by Hitachi High-Technologies Corporation), and each of longitudinal length and short-side length was determined by averaging the values of 10 columnar textures. Here, the short-side length of each columnar texture was determined by measuring the length in the short-side direction at arbitrary 20 points within the texture and calculating an average value thereof.

(7) Thickness Uniformity

First, a porous hollow-fiber membrane was resin-embedded in an epoxy resin and subjected to osmium dyeing treatment, and the void portion was thereby filled with an epoxy resin. Next, using a scanning electron microscope (SEM) equipped with a focused ion beam (FIB), a face parallel to the short-side direction of the porous hollow-fiber membrane was cut out using FIB, and FIB cutting and SEM observation were repeatedly conducted 200 times at 50 nm intervals toward the longitudinal direction of the porous hollow-fiber membrane to obtain information at a depth of 10 μm.

The thickness uniformity was determined by comparing a first cross-section and a second cross-section each being parallel to the short-side direction of the porous hollow-fiber membrane, which were obtained in continuous cross-section observation using FIB above. Here, 20 pairs of first cross-section and second cross-section were selected so that these cross-sections were parallel to each other and are spaced 5 μm apart. First, in each cross-section, a portion including resin and a void portion (epoxy portion) were distinguished, and the area of the resin portion and the area of the void portion were measured. Subsequently, the area of a portion where when the first cross-section is projected onto the second cross-section from a direction perpendicular to both cross-sections, the portion including resin in the first cross-section and the portion including resin in the second cross-section are overlapped, was determined and taken as the overlap area. The thickness uniformity was calculated as a value determined by averaging thickness uniformities A and B obtained according to the following formulae (2) and (3), and an average value of 20 pairs was adopted. The membrane was determined to have a columnar texture when 16 pairs or more have a thickness uniformity of 0.60 or more, and determined to have a fibrous texture when 15 pairs or less have the thickness uniformity above.

$$\text{Thickness uniformity A} = (\text{overlap area})/(\text{area of resin portion of second cross-section}) \quad (2)$$

$$\text{Thickness uniformity B} = (\text{overlap area})/(\text{area of resin portion of first cross-section}) \quad (3)$$

(8) Porosity

With respect to arbitrary 30 cross-sections obtained in "(6) Longitudinal Length and Short-Side Length of Columnar Texture", the porosity was determined according to the following formula (4) by using the area of the resin portion and the area of the void portion, and an average value thereof was used.

$$\text{Porosity (\%)} = \{100 \times (\text{area of void portion})\}/\{(\text{area of resin portion}) + (\text{area of void portion})\} \quad (4)$$

(9) Heat Shrinkage Rate

A porous hollow-fiber membrane stored at 25° C. was cut out into a length of 200 mm in the longitudinal direction, and a marked line was drawn at intervals of 150 mm in the longitudinal direction of the sample. The sample was left to stand still for 1 hour under no tension in a warm water bath at 80° C., thereby performing a heat treatment, and then cooled to 25° C., and the distance between marked lines was measured. Also, the sample was left to stand still for 20 minutes under no tension in an autoclave at 121° C., thereby performing a heat treatment, and then cooled to 25° C., and the distance between marked lines was measured. The heat shrinkage rate at each temperature was determined from a change in the marked line-to-marked line distance between before and after heat treatment, according to the following formula (6). The test was performed 5 times or more by changing the sample, and an average value thereof was used.

Heat shrinkage rate (%)={1−(distance between marked lines after heat treatment at 80° C. or 121° C.)/(distance between marked lines before heat treatment)}×100 (6)

(10) Occupancy of Texture

A photograph of a cross-section in the longitudinal direction of a porous hollow-fiber membrane was taken by a scanning electron microscope at a magnification of 3,000 times in arbitrary 20 places and the following formula (5) was applied to determine the occupancy of each texture, and an average value thereof was adopted. Here, the area of the entire photograph and the area occupied by a texture were determined by printing the taken photograph on paper and converting respective areas into the weight of paper corresponding to the entire photograph and the weight of paper corresponding to a texture portion cut out therefrom.

Occupancy (%) of each texture={(area occupied by each texture)/(area of entire photograph)}×100 (5)

(11) Crystallization Temperature Tc of Fluororesin-Based Polymer Solution

A rise temperature of a crystallization peak observed in the process, in which a differential scanning calorimeter (DSC, DSC-6200, manufactured by Seiko Instruments & Electronics Ltd.) was used, a mixture having the same composition as the composition of the membrane-forming polymer formulated solution containing a fluororesin-based polymer, a solvent, etc. was sealed in a sealing-type DSC container, the mixture was uniformly dissolved by raising the temperature to a dissolution temperature at a temperature rise rate of 10° C./min, and the temperature was held for 30 minutes, and then lowered at a temperature drop rate of 10° C./min, was taken as the crystallization temperature (Tc).

Example 1

38 wt % of a vinylidene fluoride homopolymer (KF1300, produced by Kureha Corporation, weight average molecular weight: 417,000, number average molecular weight: 221,000) and 62 wt % of γ-butyrolactone were dissolved at 150° C. Tc of this vinylidene fluoride homopolymer solution was 51° C. The solution was allowed to stay in a line between two gear pumps for 20 seconds at 99 to 101° C. under a pressure of 2.0 MPa by disposing those gear pumps and then discharged from an outer tube of a dual tube-type spinneret, and an aqueous 85 wt % γ-butyrolactone solution was simultaneously discharged from an inner tube of the dual tube-type spinneret. The discharged solutions were allowed to stay in a first cooling bath at a temperature of 5° C. containing an aqueous 85 wt % γ-butyrolactone solution for 10 seconds and then allowed to stay in a second cooling bath at a temperature of 35° C. containing an aqueous 85 wt % γ-butyrolactone solution for 50 seconds, thereby causing solidification. The obtained porous hollow-fiber had a columnar texture having a thickness uniformity of 0.66, where the occupancy of a spherical structure was 9%.

Subsequently, the porous hollow-fiber obtained above was stretched at a stretch ratio of 2.2 times in water at 95° C. and then relaxed at a relax ratio of 0.88 times under no tension in water at 80° C. The porous hollow-fiber membrane after relaxation had a columnar texture having a longitudinal length of 15 µm, a short-side length of 2.4 µm, and a thickness uniformity of 0.65, where the porosity was 70%, the peak temperature of the loss modulus (E″) was 68° C., and the orientation degree π of the molecular chain of the vinylidene fluoride homopolymer in the longitudinal direction of the porous hollow-fiber membrane was 0.49. The structure and performance of the porous hollow-fiber membrane after relaxation are shown in Table 1.

Example 2

The operation from preparation to solidification of a solution was performed in the same way as in Example 1.

Subsequently, the porous hollow-fiber obtained above was stretched at a stretch ratio of 2.2 times in water at 95° C. and then relaxed at a relax ratio of 0.95 times under tension in water at 85° C. The porous hollow-fiber membrane after relaxation had a columnar texture having a longitudinal length of 16 µm, a short-side length of 2.3 µm, and a thickness uniformity of 0.64, where the porosity was 64%, the peak temperature of the loss modulus (E″) was 66° C., and the orientation degree π of the molecular chain of the vinylidene fluoride homopolymer in the longitudinal direction of the porous hollow-fiber membrane was 0.51. The structure and performance of the porous hollow-fiber membrane after relaxation are shown in Table 1.

Example 3

36 wt % of a vinylidene fluoride homopolymer (KF1300, produced by Kureha Corporation, weight average molecular weight: 417,000, number average molecular weight: 221,000) and 64 wt % of γ-butyrolactone were dissolved at 150° C. Tc of this vinylidene fluoride homopolymer solution was 48° C. The operation until solidification of a solution was performed in the same way as in Example 1 except that the solution obtained above was used. The porous hollow-fiber obtained had a columnar texture having a thickness uniformity of 0.63, where the occupancy of a spherical structure was 13%.

Subsequently, the porous hollow-fiber obtained above was stretched at a stretch ratio of 2.8 times in water at 95° C. and then relaxed at a relax ratio of 0.90 times under tension in water at 85° C. The porous hollow-fiber membrane after relaxation had a columnar texture having a longitudinal length of 19 µm, a short-side length of 1.9 µm, and a thickness uniformity of 0.63, where the porosity was 66%, the peak temperature of the loss modulus (E″) was 67° C., and the orientation degree π of the molecular chain of the vinylidene fluoride homopolymer in the longitudinal direction of the porous hollow-fiber membrane was 0.70. The structure and performance of the porous hollow-fiber membrane after relaxation are shown in Table 1.

Example 4

The operation from preparation to solidification of a solution was performed in the same way as in Example 3.

Subsequently, the porous hollow-fiber obtained above was stretched at a stretch ratio of 2.2 times in water at 95° C. and then relaxed at a relax ratio of 0.95 times under tension in water at 30° C. The porous hollow-fiber membrane after relaxation had a columnar texture having a longitudinal length of 16 µm, a short-side length of 2.2 µm, and a thickness uniformity of 0.63, where the porosity was 65%, the peak temperature of the loss modulus (E″) was 66° C., and the orientation degree π of the molecular chain of the vinylidene fluoride homopolymer in the longitudinal direction of the porous hollow-fiber membrane was 0.54. The structure and performance of the porous hollow-fiber membrane after relaxation are shown in Table 1.

Example 5

The operation from preparation to solidification of a solution was performed in the same way as in Example 3.

Subsequently, the porous hollow-fiber obtained above was stretched at a stretch ratio of 2.2 times in water at 95° C. and then relaxed at a relax ratio of 0.75 times under no tension in water at 121° C. The porous hollow-fiber membrane after relaxation had a columnar texture having a longitudinal length of 14 μm, a short-side length of 2.2 μm, and a thickness uniformity of 0.67, where the porosity was 71%, the peak temperature of the loss modulus (E") was 72° C., and the orientation degree π of the molecular chain of the vinylidene fluoride homopolymer in the longitudinal direction of the porous hollow-fiber membrane was 0.47. The structure and performance of the porous hollow-fiber membrane after relaxation are shown in Table 1.

Example 6

40 wt % of a vinylidene fluoride homopolymer (KF1300, produced by Kureha Corporation, weight average molecular weight: 417,000, number average molecular weight: 221,000) and 60 wt % of dimethylsulfoxide were dissolved at 130° C. Tc of this vinylidene fluoride homopolymer solution was 30° C. The solution was allowed to stay in a line between two gear pumps for 20 seconds at 78 to 80° C. under a pressure of 2.0 MPa by disposing those gear pumps and then discharged from an outer tube of a dual tube-type spinneret, and an aqueous 90 wt % dimethylsulfoxide solution was simultaneously discharged from an inner tube of the dual tube-type spinneret. The discharged solutions were allowed to stay in a first cooling bath at a temperature of −5° C. containing an aqueous 85 wt % dimethylsulfoxide solution for 10 seconds and then allowed to stay in a second cooling bath at a temperature of 20° C. containing an aqueous 85 wt % dimethylsulfoxide solution for 50 seconds, thereby causing solidification. The obtained porous hollow-fiber had a columnar texture having a thickness uniformity of 0.72, where the occupancy of a spherical structure was 5%.

Subsequently, the porous hollow-fiber obtained above was stretched at a stretch ratio of 2.0 times in water at 95° C. and then relaxed at a relax ratio of 0.86 times under no tension in water at 80° C. The porous hollow-fiber membrane after relaxation had a columnar texture having a longitudinal length of 15 μM, a short-side length of 2.3 μm, and a thickness uniformity of 0.69, where the porosity was 69%, the peak temperature of the loss modulus (E") was 69° C., and the orientation degree π of the molecular chain of the vinylidene fluoride homopolymer in the longitudinal direction of the porous hollow-fiber membrane was 0.44. The structure and performance of the porous hollow-fiber membrane after relaxation are shown in Table 1.

Example 7

The operation from preparation to solidification of a solution was performed in the same way as in Example 6.

Subsequently, the porous hollow-fiber obtained above was stretched at a stretch ratio of 3.0 times in water at 95° C. and then relaxed at a relax ratio of 0.86 times under no tension in water at 80° C. The porous hollow-fiber membrane after relaxation had a columnar texture having a longitudinal length of 22 μm, a short-side length of 1.8 μm, and a thickness uniformity of 0.69, where the porosity was 61%, the peak temperature of the loss modulus (E") was 68° C., and the orientation degree π of the molecular chain of the vinylidene fluoride homopolymer in the longitudinal direction of the porous hollow-fiber membrane was 0.81. The structure and performance of the porous hollow-fiber membrane after relaxation are shown in Table 1.

Example 8

The operation from preparation to solidification of a solution was performed in the same way as in Example 6.

Subsequently, the porous hollow-fiber obtained above was stretched at a stretch ratio of 3.0 times in water at 95° C. and then relaxed at a relax ratio of 0.95 times under tension in water at 85° C. The porous hollow-fiber membrane after relaxation had a columnar texture having a longitudinal length of 24 μm, short-side length of 1.7 μm, and a thickness uniformity of 0.63, where the porosity was 63%, the peak temperature of the loss modulus (E") was 66° C., and the orientation degree π of the molecular chain of the vinylidene fluoride homopolymer in the longitudinal direction of the porous hollow-fiber membrane was 0.84. The structure and performance of the porous hollow-fiber membrane after relaxation are shown in Table 1.

Example 9

The operation from preparation to solidification of a solution was performed in the same way as in Example 6.

Subsequently, the porous hollow-fiber obtained above was stretched at a stretch ratio of 3.0 times in water at 95° C. and then relaxed at a relax ratio of 0.95 times under tension in water at 30° C. The porous hollow-fiber membrane after relaxation had a columnar texture having a longitudinal length of 25 μm, a short-side length of 1.6 μ, and a thickness uniformity of 0.62, where the porosity was 66%, the peak temperature of the loss modulus (E") was 66° C., and the orientation degree π of the molecular chain of the vinylidene fluoride homopolymer in the longitudinal direction of the porous hollow-fiber membrane was 0.85. The structure and performance of the porous hollow-fiber membrane after relaxation are shown in Table 1.

Comparative Example 1

The operation from preparation to discharge of a solution was performed in the same way as in Example 1. The discharged solutions were allowed to stay in a cooling bath at a temperature of 5° C. containing an aqueous 85 wt % γ-butyrolactone solution for 20 seconds and thereby solidified. The obtained porous hollow-fiber had a fibrous texture having a thickness uniformity of 0.47, where the occupancy of a spherical structure was 9%.

Subsequently, the porous hollow-fiber obtained above was stretched at a stretch ratio of 1.5 times in water at 95° C. The porous hollow-fiber membrane after stretching had a fibrous texture having a longitudinal length of 15 μm, short-side length of 2.2 μm, and a thickness uniformity of 0.45, where the porosity was 63%, the peak temperature of the loss modulus (E") was 62° C., and the molecular chain of the vinylidene fluoride homopolymer was unoriented.

The structure and performance of the porous hollow-fiber membrane after stretching are shown in Table 2.

Comparative Example 2

The operation from preparation to solidification of a solution was performed in the same way as in Comparative Example 1.

Subsequently, the porous hollow-fiber obtained above was stretched at a stretch ratio of 1.5 times in water at 95° C. and then relaxed at a relax ratio of 0.95 times under tension in water at 85° C. The porous hollow-fiber membrane after relaxation had a fibrous texture having a longitudinal length of 14 μM, a short-side length of 2.3 μ, and a thickness uniformity of 0.47, where the porosity was 62%, the peak temperature of the loss modulus (E") was 62° C., and the molecular chain of the vinylidene fluoride homopolymer was unoriented. The structure and performance of the porous hollow-fiber membrane after relaxation are shown in Table 2.

Comparative Example 3

The operation from preparation to discharge of a solution was performed in the same way as in Example 3. The discharged solutions were allowed to stay in a cooling bath at a temperature of 0° C. containing an aqueous 85 wt % γ-butyrolactone solution for 15 seconds and thereby solidified. The obtained porous hollow-fiber had a fibrous texture having a thickness uniformity of 0.45, where the occupancy of a spherical structure was 9%.

Subsequently, the porous hollow-fiber obtained above was stretched at a stretch ratio of 2.5 times in water at 95° C. The porous hollow-fiber membrane after stretching had a fibrous texture having a longitudinal length of 18 μm, a short-side length of 2.0 μm, and a thickness uniformity of 0.42, where the porosity was 65%, the peak temperature of the loss modulus (E") was 60° C., and the molecular chain of the vinylidene fluoride homopolymer was unoriented. The structure and performance of the porous hollow-fiber membrane after stretching are shown in Table 2.

Comparative Example 4

35 wt % of a vinylidene fluoride homopolymer (KF1300, produced by Kureha Corporation, weight average molecular weight: 417,000, number average molecular weight: 221,000) and 65 wt % of γ-butyrolactone were dissolved at 150° C. Tc of this vinylidene fluoride homopolymer solution was 47° C. The solution was allowed to stay in a line between two gear pumps for 20 seconds at 99 to 101° C. under a pressure of 0.2 MPa by disposing those gear pumps and then discharged from an outer tube of a dual tube-type spinneret, and an aqueous 85 wt % γ-butyrolactone solution was simultaneously discharged from an inner tube of the dual tube-type spinneret. The discharged solutions were allowed to stay in a cooling bath at a temperature of 25° C. containing an aqueous 85 wt % γ-butyrolactone solution for 20 seconds and thereby solidified. The obtained porous hollow-fiber had a fibrous texture having a thickness uniformity of 0.43, where the occupancy of a spherical structure was 76%.

Subsequently, the porous hollow-fiber obtained above was stretched at a stretch ratio of 1.5 times in water at 95° C. and then relaxed at a relax ratio of 0.90 times under tension in a dry heat atmosphere at 165° C. The porous hollow-fiber membrane after relaxation had a fibrous texture having a longitudinal length of 11 μm, a short-side length of 2.3 μm, and a thickness uniformity of 0.40, where the porosity was 68%, the peak temperature of the loss modulus (E") was 62° C., and the molecular chain of the vinylidene fluoride homopolymer was unoriented. The structure and performance of the porous hollow-fiber membrane after relaxation are shown in Table 2.

Comparative Example 5

The operation from preparation to discharge of a solution was performed in the same way as in Example 6. The discharged solutions were allowed to stay in a cooling bath at a temperature of 0° C. containing an aqueous 85 wt % dimethylsulfoxide solution for 20 seconds and thereby solidified. The obtained porous hollow-fiber had a fibrous texture having a thickness uniformity of 0.56, where the occupancy of a spherical structure was 16%.

Subsequently, the porous hollow-fiber obtained above was stretched at a stretch ratio of 1.5 times in water at 95° C. The porous hollow-fiber membrane after stretching had a fibrous texture having a longitudinal length of 18 μm, a short-side length of 1.2 μm, and a thickness uniformity of 0.53, where the porosity was 64%, the peak temperature of the loss modulus (E") was 61° C., and the molecular chain of the vinylidene fluoride homopolymer was unoriented. The structure and performance of the porous hollow-fiber membrane after stretching are shown in Table 2.

Comparative Example 6

The operation from preparation to solidification of a solution was performed in the same way as in Comparative Example 5.

Subsequently, the porous hollow-fiber obtained above was stretched at a stretch ratio of 1.5 times in water at 95° C. and then relaxed at a relax ratio of 0.95 times under tension in water at 85° C. The porous hollow-fiber membrane after relaxation had a fibrous texture having a longitudinal length of 17 μm, a short-side length of 1.2 μm, and a thickness uniformity of 0.55, where the porosity was 66%, the peak temperature of the loss modulus (E") was 61° C., and the molecular chain of the vinylidene fluoride homopolymer was unoriented. The structure and performance of the porous hollow-fiber membrane after relaxation are shown in Table 2.

Comparative Example 7

36 wt % of a vinylidene fluoride homopolymer (KF1300, produced by Kureha Corporation, weight average molecular weight: 417,000, number average molecular weight: 221,000) and 64 wt % of dimethylsulfoxide were dissolved at 130° C. Tc of this vinylidene fluoride homopolymer solution was 28° C. Two gear pumps were disposed and, the solution was allowed to stay in a line between the two gear pumps for 20 seconds at 78 to 80° C. under a pressure of 2.0 MPa and then discharged from an outer tube of a dual tube-type spinneret, and an aqueous 90 wt % dimethylsulfoxide solution was simultaneously discharged from an inner tube of the dual tube-type spinneret. The discharged solutions were allowed to stay in a cooling bath at a temperature of 0° C. containing an aqueous 85 wt % dimethylsulfoxide solution for 20 seconds and thereby solidified. The obtained porous hollow-fiber had a fibrous texture having a thickness uniformity of 0.54, where the occupancy of a spherical structure was 16%.

Subsequently, the porous hollow-fiber obtained, above was stretched at a stretch ratio of 2.0 times in water at 95° C. The porous hollow-fiber membrane after stretching had a fibrous texture having a longitudinal length of 20 μm, a short-side length of 1.1 μm, and a thickness uniformity of 0.50, where the porosity was 65%, the peak temperature of the loss modulus (E") was 62° C., and the molecular chain of the vinylidene fluoride homopolymer was unoriented. The structure and performance of the porous hollow-fiber membrane after stretching are shown in Table 2.

Comparative Example 8

Operation of preparation of a solution was performed in the same way as in Comparative Example 7. Two gear pumps were disposed and the solution was allowed to stay in a line between the two gear pumps for 20 seconds at 78 to 80° C. under a pressure of 0.2 MPa and then discharged from an outer tube of a dual tube-type spinneret, and an aqueous 90 wt % dimethylsulfoxide solution was simultaneously discharged from an inner tube of the dual tube-type spinneret. The discharged solutions were allowed to stay in a cooling bath at a temperature of 0° C. containing an aqueous 85 wt % dimethylsulfoxide solution for 20 seconds and thereby solidified. The obtained porous hollow-fiber had a fibrous texture having a thickness uniformity of 0.45, where the occupancy of a spherical structure was 70%.

Subsequently, the porous hollow-fiber obtained above was stretched at a stretch ratio of 1.5 times in water at 95° C. and the relaxed at a relax ratio of 0.95 times under tension in water at 85° C. The porous hollow-fiber membrane after relaxation had a fibrous texture having a longitudinal length of 13 μm, a short-side length of 2.2 μ, and a thickness uniformity of 0.44, where the porosity was 62%, the peak temperature of the loss modulus (E") was 62° C., and the molecular chain of the vinylidene fluoride homopolymer was unoriented. The structure and performance of the porous hollow-fiber membrane after relaxation are shown in Table 2.

TABLE 1

|  |  | Unit | Example 1 | Example 2 | Example 3 | Example 4 | Example 5 | Example 6 | Example 7 | Example 8 | Example 9 |
|---|---|---|---|---|---|---|---|---|---|---|---|
| Production method | Fluororesin-based polymer concentration | wt % | 38 | 38 | 36 | 36 | 36 | 40 | 40 | 40 | 40 |
|  | Solvent concentration γ-Butyrolactone | wt % | 62 | 62 | 64 | 64 | 64 | — | — | — | — |
|  | Dimethylsulfoxide | wt % | — | — | — | — | — | 60 | 60 | 60 | 60 |
|  | Stretch ratio | times | 2.2 | 2.2 | 2.8 | 2.2 | 2.2 | 2.0 | 3.0 | 3.0 | 3.0 |
|  | Relax ratio | times | 0.88 | 0.95 | 0.90 | 0.95 | 0.75 | 0.86 | 0.86 | 0.95 | 0.95 |
|  | Relaxation temperature | ° C. | 80 | 85 | 85 | 30 | 121 | 80 | 80 | 85 | 30 |
| Structure | Peak temperature of loss modulus | ° C. | 68 | 66 | 67 | 66 | 72 | 69 | 68 | 66 | 66 |
|  | Orientation degree π | — | 0.49 | 0.51 | 0.70 | 0.54 | 0.47 | 0.44 | 0.81 | 0.84 | 0.85 |
|  | Thickness uniformity | — | 0.65 | 0.64 | 0.63 | 0.63 | 0.67 | 0.69 | 0.69 | 0.63 | 0.62 |
|  | Porosity | % | 70 | 64 | 66 | 65 | 71 | 69 | 61 | 63 | 66 |
| Performance | Pure-water permeation performance | m³/m²/hr | 2.8 | 2.7 | 1.7 | 2.0 | 2.2 | 1.4 | 1.9 | 1.7 | 1.8 |
|  | Breaking strength | MPa | 26 | 32 | 40 | 22 | 40 | 28 | 49 | 42 | 31 |
|  | Elongation at break | % | 142 | 86 | 54 | 166 | 176 | 203 | 142 | 80 | 92 |
|  | F5 Value at 25° C. | MPa | 12.8 | 11.2 | 11.8 | 9.5 | 23.0 | 12.4 | 14.8 | 11.5 | 10.2 |
|  | F5 Value at 80° C. | MPa | 9.3 | 7.6 | 8.7 | 6.9 | 14.8 | 8.8 | 10.7 | 7.7 | 7.0 |
|  | F5 Value at 121° C. | MPa | 5.9 | 5.3 | 7.3 | 5.3 | 10.7 | 6.2 | 7.0 | 5.2 | 5.4 |
|  | Heat shrinkage rate at 80° C. | % | 0.8 | 8.6 | 5.0 | 9.4 | 0.2 | 0.5 | 0.2 | 8.1 | 9.5 |
|  | Heat shrinkage rate at 121° C. | % | 15.4 | 21.7 | 18.6 | 22.9 | 1.5 | 12.0 | 11.5 | 20.6 | 23.4 |

TABLE 2

|  |  | Unit | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|
| Production method | Fluororesin-based polymer concentration | wt % | 38 | 38 | 36 | 35 | 40 | 40 | 36 | 36 |
|  | Solvent concentration γ-Butyrolactone | wt % | 62 | 62 | 64 | 65 | — | — | — | — |
|  | Dimethylsulfoxide | wt % | — | — | — | — | 60 | 60 | 64 | 64 |
|  | Stretch ratio | times | 1.5 | 1.5 | 2.5 | 1.5 | 1.5 | 1.5 | 2.0 | 1.5 |
|  | Relax ratio | times | 1.00 | 0.95 | 1.00 | 0.90 | 1.00 | 0.95 | 1.00 | 0.95 |
|  | Relaxation temperature | ° C. | — | 85 | — | 165 | — | 85 | — | 85 |
| Structure | Peak temperature of loss modulus | ° C. | 62 | 62 | 60 | 62 | 61 | 61 | 62 | 62 |
|  | Orientation degree π | — | unoriented | unoriented | unoriented | unoriented | unoriented | unoriented | unoriented | unoriented |
|  | Thickness uniformity | — | 0.45 | 0.47 | 0.42 | 0.40 | 0.53 | 0.55 | 0.50 | 0.44 |
|  | Porosity | % | 63 | 62 | 65 | 68 | 64 | 66 | 65 | 62 |
| Performance | Pure-water permeation performance | m³/m²/hr | 2.3 | 2.5 | 2.8 | 1.5 | 0.8 | 1.0 | 1.9 | 1.3 |
|  | Breaking strength | MPa | 14 | 15 | 17 | 18 | 18 | 18 | 20 | 7 |
|  | Elongation at break | % | 130 | 112 | 71 | 57 | 185 | 158 | 102 | 84 |
|  | F5 Value at 25° C. | MPa | 6.6 | 7.3 | 8.5 | 8.9 | 8.0 | 8.5 | 8.8 | 3.8 |

TABLE 2-continued

|  | Unit | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| F5 Value at 80° C. | MPa | 4.8 | 5.0 | 5.5 | 5.6 | 5.2 | 5.6 | 5.9 | 2.4 |
| F5 Value at 121° C. | MPa | 3.5 | 3.7 | 4.1 | 4.1 | 3.7 | 4.0 | 4.1 | 1.7 |
| Heat shrinkage rate at 80° C. | % | 12.9 | 10.2 | 14.7 | 10.8 | 14.2 | 11.4 | 13.6 | 11.1 |
| Heat shrinkage rate at 121° C. | % | 28.6 | 24.4 | 31.1 | 26.4 | 31.5 | 25.5 | 29.8 | 26.0 |

As seen from the results above, the porous hollow-fiber membranes of Examples had high-performance breaking strength or pure-water permeation performance and furthermore, exhibited a reduced heat shrinkage rate. Accordingly, it was confirmed that the porous hollow-fiber membrane of the present invention is a porous hollow-fiber membrane having excellent thermal deformation resistance while satisfying both high strength and high pure-water permeation performance.

While the invention has been described in detail and with reference to specific embodiments thereof, it will be apparent to one skilled in the art that various changes and modifications can be made therein without departing from the spirit and scope of the invention. This application is based on Japanese Patent Application (Patent Application No. 2015-170152) filed on Aug. 31, 2015, the entirety of which is incorporated herein by way of reference.

INDUSTRIAL APPLICABILITY

According to the present invention, a porous hollow-fiber membrane exhibiting excellent chemical durability owing to a fluororesin-based polymer with high chemical resistance and at the same time, having all of excellent physical durability, thermal deformation resistance and high pure-water permeation performance is provided. In the case of applying this membrane to the food industry or the pharmaceutical and medical field, shrinkage of the membrane at the time of hot water disinfection or steam sterilization can be prevented, and reduction in the membrane cleaning effect due to tightening with no loosening of the membrane or the reduction in the separation performance due to partial breakage of the membrane can be prevented.

The invention claimed is:

1. A porous hollow-fiber membrane comprising a fluororesin-based polymer, wherein
the porous hollow-fiber membrane has a columnar texture oriented in a longitudinal direction of the porous hollow-fiber membrane,
a stress at 5% elongation (F5 value) in the longitudinal direction at 80° C. is 6.9 MPa or more,
the F5 value in the longitudinal direction at 121° C. is 5.2 MPa or more,
the F5 value in the longitudinal direction at 25° C. is 12 MPa or more, and
a loss modulus (E")-temperature curve obtained in a dynamic viscoelasticity test (temperature dependency test) has a peak and the temperature at the peak is from 68 to 80° C.

2. The porous hollow-fiber membrane according to claim 1, wherein a porosity is from 40 to 90%.

3. The porous hollow-fiber membrane according to claim 2, wherein
a molecular chain of the fluororesin-based polymer is oriented in the longitudinal direction of the porous hollow-fiber membrane, and
an orientation degree π of the molecular chain calculated based on the following formula (1) from a half-width H (°) obtained by wide-angle X-ray diffraction determination is 0.4 or more and less than 1.0:

$$\text{Orientation degree } \pi = (180° - H)/180° \tag{1}$$

provided that H is a half-width of an intensity distribution obtained by circumferentially scanning a crystal peak in the wide-angle X-ray diffraction determination.

4. The porous hollow-fiber membrane according to claim 1, wherein
a molecular chain of the fluororesin-based polymer is oriented in the longitudinal direction of the porous hollow-fiber membrane, and
an orientation degree π of the molecular chain calculated based on the following formula (1) from a half-width H (°) obtained by wide-angle X-ray diffraction determination is 0.4 or more and less than 1.0:

$$\text{Orientation degree } \pi = (180° - H)/180° \tag{1}$$

provided that H is a half-width of an intensity distribution obtained by circumferentially scanning a crystal peak in the wide-angle X-ray diffraction determination.

5. A method for producing a porous hollow-fiber membrane, the method comprising the following steps(1) to (3):
(1) a step of forming a hollow fiber having a columnar texture which is oriented in a longitudinal direction of the porous hollow-fiber and has a thickness uniformity of 0.60 or more and less than 1.00, from a membrane forming solution containing a fluororesin-based polymer by thermally induced phase separation;
(2) a step of stretching the porous hollow-fiber obtained in the step (1) at a stretch ratio of 1.8 to 4.0 times in a longitudinal direction; and
(3) a step of relaxing the porous hollow-fiber membrane obtained in the step (2) at a relax ratio of 0.70 to 0.88 times in the longitudinal direction.

6. The method for producing a porous hollow-fiber membrane according to claim 5, wherein the relaxing step (3) is performed at 50 to 125° C.

* * * * *